(12) United States Patent
Li et al.

(10) Patent No.: US 6,541,159 B1
(45) Date of Patent: Apr. 1, 2003

(54) OXYGEN SEPARATION THROUGH HYDROXIDE-CONDUCTIVE MEMBRANE

(75) Inventors: Lin-Feng Li, Croton-on-Hudson, NY (US); Wayne Yao, Saddle Brook, NJ (US); Muguo Chen, Bedford Hills, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/373,469

(22) Filed: Aug. 12, 1999

(51) Int. Cl.[7] .......................... H01M 4/80; C25B 13/00; C25C 7/04; C25C 1/10
(52) U.S. Cl. ........................ 429/236; 429/235; 204/295; 205/629
(58) Field of Search .................... 429/13, 19, 235, 429/236; 204/295; 205/629

(56) References Cited

U.S. PATENT DOCUMENTS

| | | |
|---|---|---|
| 3,489,670 A | 1/1970 | Maget |
| 4,131,514 A | 12/1978 | Chong et al. |
| 4,539,086 A | 9/1985 | Fujita et al. |
| 4,738,760 A | 4/1988 | Marianowski et al. |
| 4,828,941 A * | 5/1989 | Sterzel ........................ 429/33 |
| 4,879,016 A | 11/1989 | Joshi |
| 5,403,461 A | 4/1995 | Tuller et al. |
| 5,509,189 A | 4/1996 | Tuller et al. |
| 5,572,874 A | 11/1996 | Rathbone |
| 5,599,383 A | 2/1997 | Dyer et al. |
| 5,616,223 A | 4/1997 | Shen et al. |
| 5,639,437 A | 6/1997 | Balachandran et al. |
| 5,643,355 A | 7/1997 | Phillips et al. |
| 5,656,388 A | 8/1997 | Bugga et al. |
| 5,677,074 A | 10/1997 | Serpico et al. |
| 5,706,675 A | 1/1998 | Manikowski, Jr. |
| 5,788,682 A * | 8/1998 | Maget ........................ 604/290 |
| 5,788,826 A | 8/1998 | Nyberg |
| 6,171,368 B1 | 1/2001 | Maget et al. |
| 6,183,914 B1 * | 2/2001 | Yao et al. .................... 429/309 |

OTHER PUBLICATIONS

Y. Fujita, et al., "An electrochemical oxygen separator using an ion–exchange membrane as the electroyle" *Journal of Applied Electrochemistrly*, vol. 16 pp. 935–940, (1986).

Bouwmeester et al., "Dense Ceramic Membranes For Oxygen Separation", *The CRC Handbook of Solid State Electrochemistry*, pp. 481–552 (1997).

U.S. patent application Ser. No. 09/259,068, filed Feb. 26, 1999.

Advanced Oxygen Separation Membranes, Topical Report (Apr. 1989–Sep. 1990), Gas Research Institute, Doc. No. GRI–90/0303.

Y. Fujita, H. Kudo and H. Tsukamoto, 51 *Denki Kagaku* 272, "Oxygen Remover Using Gas Diffusing Electrodes" (Note—as published, the reference is In Japanese with Japanese Abstract and Drawing Captions).

* cited by examiner

*Primary Examiner*—Patrick Ryan
*Assistant Examiner*—Julian Mercado
(74) *Attorney, Agent, or Firm*—Richard L. Sampson; Ralph J. Crispino

(57) ABSTRACT

A solid-state hydroxide (OH⁻) conductive membrane provides up to five times higher ionic conductivity and surface oxygen exchange rate than conventional MIEC membranes, while operating at significantly lower temperatures and providing reduced overall system cost. The hydroxide conductive membrane utilizes a porous ceramic backbone, pores of which are injected with an electrolyte. A catalyst is provided as discrete layers disposed at the anode and cathode. The membrane of the present invention may be utilized in combination with an external voltage source to drive the oxygen generating reaction. Alternatively, the pores may be metallized and a pressure gradient utilized to drive the reaction. The membrane thus provides discrete materials to provide ionic conduction, electronic conduction, and structural support.

28 Claims, 7 Drawing Sheets

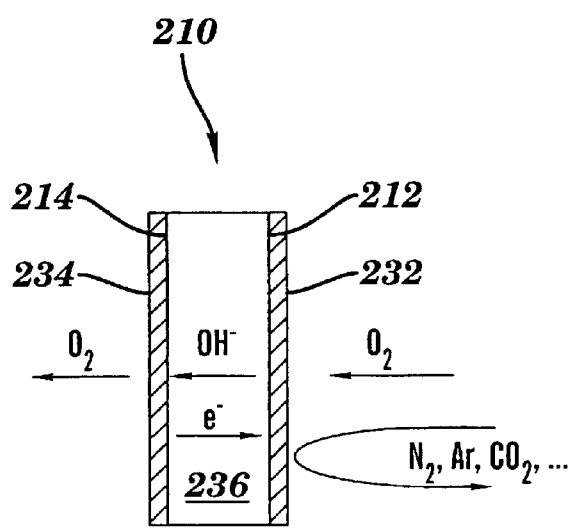 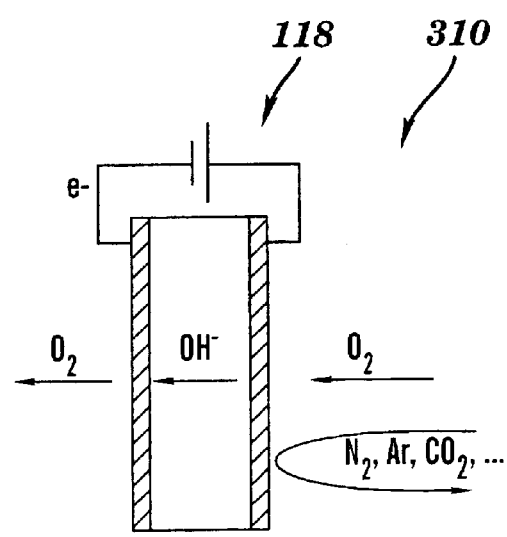
FIG. 4a  FIG. 4b

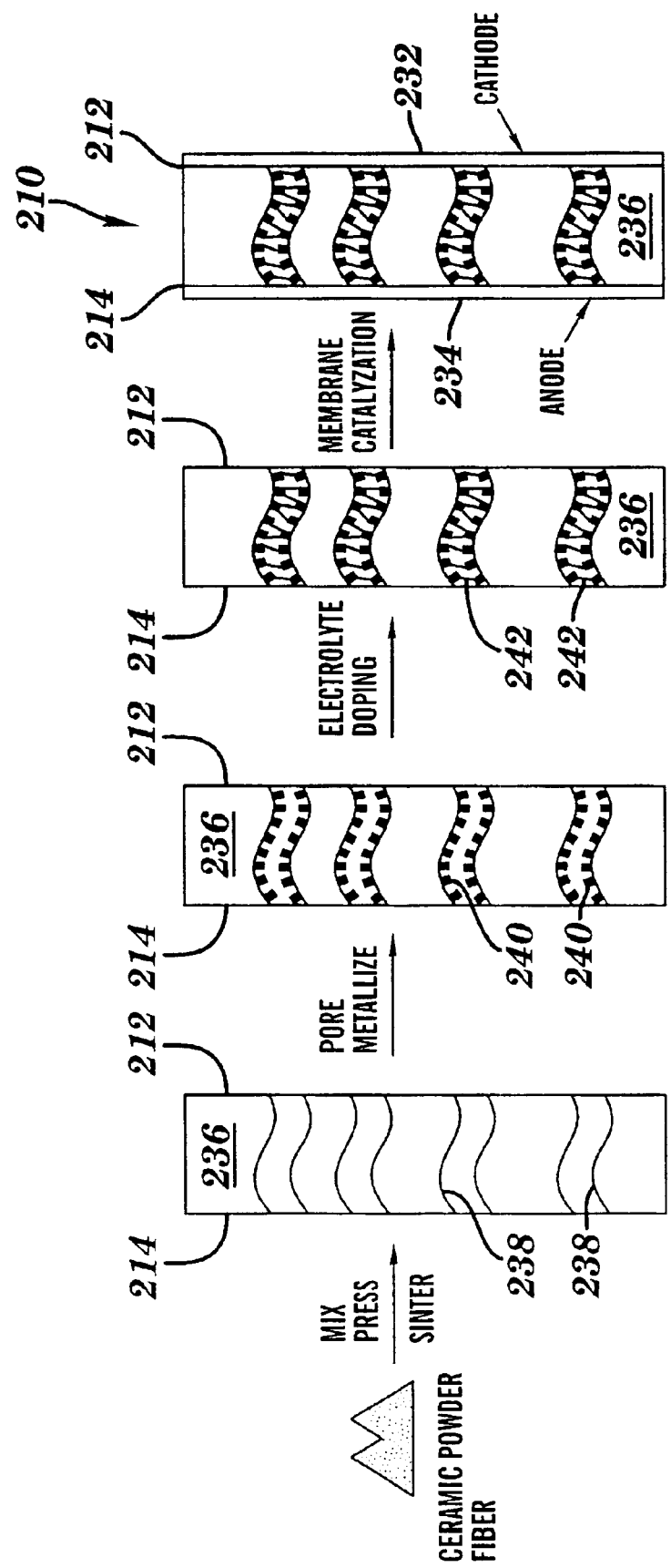

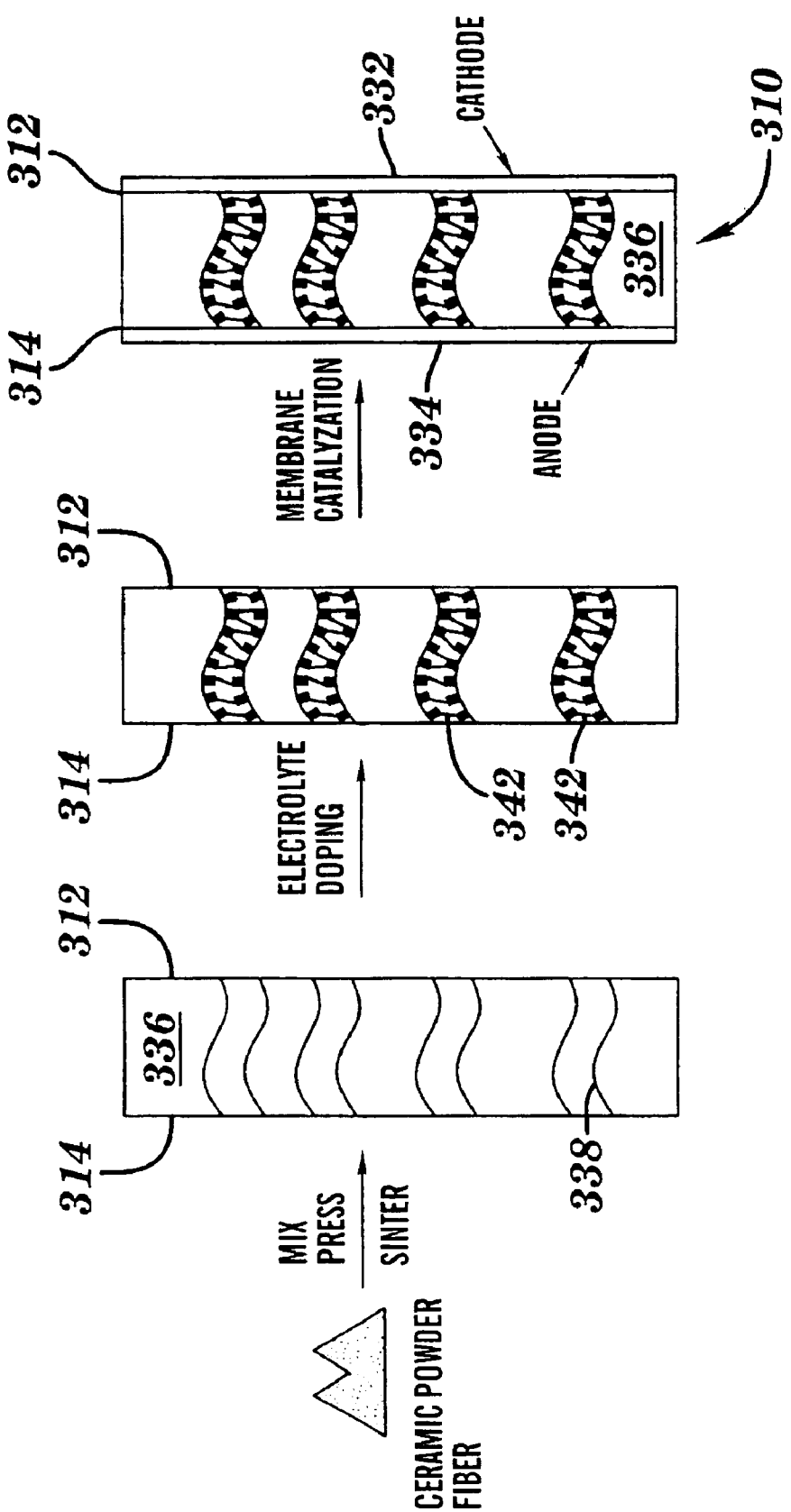

OXYGEN SEPARATION THROUGH HYDROXIDE-CONDUCTIVE MEMBRANE

BACKGROUND OF THE INVENTION

1. Field of the Invention

This invention relates to the field of ion exchange, and more particularly to an electronic-hydroxide ion conductive membrane for pressure driven and electric power driven oxygen separation.

1. Background Information

A multitude of important chemical, environmental, medical, and electronics processing technologies require pure oxygen gas. For example, oxygen is used in semiconductor fabrication for chemical vapor deposition, reactive sputtering, and reactive ion etching. It finds wide application in health services, for resuscitation, or, in combination with other chemicals, for anaesthesia. Oxygen can be used for environmental benefit by reducing the sulfur emissions of oil refineries and helping pulp and paper manufacturers meet regulations relating to bleaching, delignification, and lime kiln enrichment. The high cost of pure oxygen limits the wide adoption of such beneficial processes in the chemical, electronics, and medical industries.

High-purity oxygen is now largely produced in cryogenic air separation plants, where the air is cooled down to the melting point of nitrogen (−210° C.) and its components separated in large condensation columns. This process requires expensive, bulky equipment and high-energy consumption, which tends to militate against the use of oxygen to generate energy.

Over the last decade, a new technology has emerged for gas separation: selective membranes which pass only the desired components, such as described by H. J. M. Bouwmeester, A. J. Burggraaf, in "The CRC Handbook of Solid State Electrochemistry," Ed. P. J. Gellings, H. J. M. Bouwmeester, chapter 11, CRC Press, Boca Raton, 1997, which is incorporated by reference herein. The state-of-the-art membrane today is the Mixed Ionic-Electronic Conducting (MIEC) membrane, which relies on the transportation of oxide ($O^{2-}$) ions to separate the oxygen from air. Although this approach may offer some advantages relative to cryogenic oxygen separation, practical application of the MIEC membrane is hindered by a number of drawbacks intrinsic to oxide ($O^{2-}$) conductive membranes. These problems include: low oxygen throughput (typically caused by both low ionic conductivity and low surface oxygen exchange rate); relatively high operating temperature (>800° C.); costly materials and costly fabrication; tendency to degrade over time; and system equipment that is relatively complex and expensive to build and maintain.

Thus, a need exists for an oxygen separation method and apparatus that addresses the problems associated with both cryogenic separation and oxide-based MIEC membranes.

SUMMARY OF THE INVENTION

An important aspect of the present invention was the realization that hydroxide ions ($OH^-$), rather than oxide ions ($O^{2-}$), may be utilized to shuttle oxygen molecules through a membrane at relatively high oxygen throughput. Although a hydroxide-conductive electrolyte has been used in the alkaline fuel cell since the first Apollo program in 1960, little attention has been paid to using a hydroxide electrolyte (e.g. KOH) as an oxygen separation medium. It was realized that by using optimal electrolytes, the hydroxide ion generally has higher conductivity than the oxide ion at any given temperature. It was also recognized that the surface oxygen exchange rate is higher in an alkaline electrolyte than in an oxide electrolyte, especially at low temperature.

The present invention provides, in a first aspect, an oxygen separating membrane that includes a backbone having a first surface and a second surface and an array of interconnected pores extending therebetween. A hydroxide ion conductor extends through the pores from the first surface to the second surface.

In a variation of this aspect, an electrical conductor extends through the pores from the first surface to the second surface. The electrical conductor is discrete from the ion conductor.

In a further variation of this aspect, at least one catalyst is disposed on each of the first surface and the second surface.

The present invention provides, in a second aspect, a method of fabricating a hydroxide conductive membrane. The method includes the steps of:

a) forming a porous backbone having first and second surfaces, by mixing a ceramic powder and fiber, molding the mixture under pressure, and sintering;

b) inserting an electrolyte into the pores to provide a hydroxide conductive pathway extending between the first and second surfaces; and c) wherein the first and second surfaces respectively comprise an anode and cathode, and the membrane is ionically conductive therebetween to reduce oxygen at the anode and reoxidize hydroxide ions at the cathode.

A variation of this aspect includes the step of d) metallizing the pores to provide an electrically conductive pathway extending between the first and second surfaces, wherein the membrane is ionically and electrically conductive between the anode and the cathode.

The above and other features and advantages of this invention will be more readily apparent from a reading of the following detailed description of various aspects of the invention taken in conjunction with the accompanying drawings.

BRIEF DESCRIPTION OF THE DRAWINGS

FIG. 4a is a schematic diagram of oxygen separation through a hydroxide-conductive membrane of the present invention;

FIG. 4b is a schematic diagram of oxygen separation through an alternate embodiment of a hydroxide-conductive membrane of the present invention;

FIGS. 5a–5d are schematic representations of various steps in a fabrication process of the hydroxide-conductive membrane of FIG. 4;

FIG. 7b is schematic representation, on an enlarged scale, of a membrane assembly usable in the oxygen separation system of FIG. 7a; and FIGS. 8a–8c are schematic representations of various steps in a fabrication process of the alternate hydroxide-conductive membrane of FIG. 4b.

DETAILED DESCRIPTION OF THE PREFERRED EMBODIMENTS

Figure 1A:
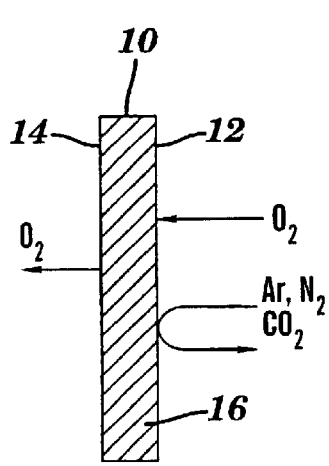
FIG. 1a is a schematic representation of the principle of oxygen separation from air through an inorganic, dense, ion-conductive membrane of the prior art.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Briefly described, the present invention includes a solid-state hydroxide ($OH^-$) conductive membrane that overcomes drawbacks associated with oxide conductive membranes. The invention is based in part upon our commonly assigned U.S. patent applications Ser. No. 09/259068, entitled "Solid Gel Membranes", filed on Feb. 26, 1999; and Ser. No. 09/156135, entitled "Polymer-Based Hydroxide Conducting Membrane", filed on Sep. 17, 1998, both of which are incorporated by reference herein. Compared to conventional MIEC technology at high temperatures (>800° C.), the membrane of the present invention advantageously provides up to five times higher ionic conductivity and surface oxygen exchange rate at significantly lower operating temperatures (<150° C.), provides greater flexibility in selecting materials, has robust construction, and provides reduced overall system cost due to relatively low material cost and lower temperature operation.

Where used in this disclosure, the term "conductivity" or "σ" shall be defined as set forth by H. Arai, in Bull. Ceram. Soc. Jpn., 27, 100, 1992.

Referring now to the drawings in detail, the present invention will be described. The ability to selectively pass oxygen is shared by a wide variety of membrane materials, from structurally fragile and/or compliant organic polymers to relatively hardy, inorganic ceramic mixtures. The present application will primarily discuss the latter inorganic membranes due to their advantageous physical durability and convenient use in a wide range of applications. More specifically, this discussion will focus on so-called dense inorganic membranes, which have desirable selectivity and produce relatively high purity oxygen. It should be recognized, however, that the present invention also may be practiced with organic polymeric materials such as polyethylene oxide, polyacrylamide, and polyacrylic acid.

Turning now to FIG. 1a, a general process that occurs in a conventional ionic-electronic membrane 10 is shown. Air arrives at the cathode 12, where the oxygen is reduced, but other species do not react. The oxygen is shuttled across the membrane 10 in the form of an ion such as $O^{2-}$ (the process of ionic conduction). At the anode 14, a complementary chemical reaction evolves pure oxygen, which is released. Functionally, this type of membrane 10 has three primary components: the backbone 16, which provides the membrane's structure; the ionic conductor (not shown), which conducts the ions across the membrane; and a catalyst (not shown), which aids the reduction of oxygen at the cathode 12 and the evolution of oxygen at the anode 14.

The overall oxygen throughput is determined primarily by two parameters (the conductivity of the electrons is generally too fast to be a limiting factor). The first is the ionic conductivity (how fast the ions can travel across the membrane), which is dependent on the electrolyte properties. The second is the surface oxygen exchange rate (how quickly the oxygen is reduced and evolved on each side), which is dependent on both the ionic conductor and the catalyst properties.

Figure 1B:
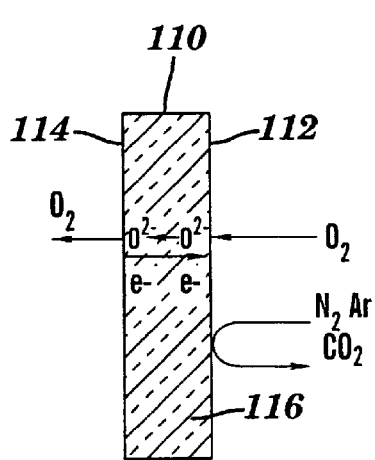
FIG. 1b is a schematic representation of the principle of oxygen separation from air through an inorganic, dense, mixed ionic-electronic conductive (MIEC) membrane of the prior art.

Referring now to FIG. 1b, prior art mixed ionic-electronic conducting (MEIC) membranes 110 typically utilize only a single component, i.e., a ceramic-noble metal composite, to play all three functional roles, namely, backbone, ion conduction and catalyst. This material provides the physical membrane structure 116, reduces and evolves the oxygen, and relays the $O^{2-}$ ions and charge-compensating electrons in opposite directions as shown. To drive the reaction, a pressure differential is required, with the air pressure at the cathode 112 exceeding the oxygen pressure at the anode 114, i.e., by a factor of about 2 to 10.

Figure 1C:
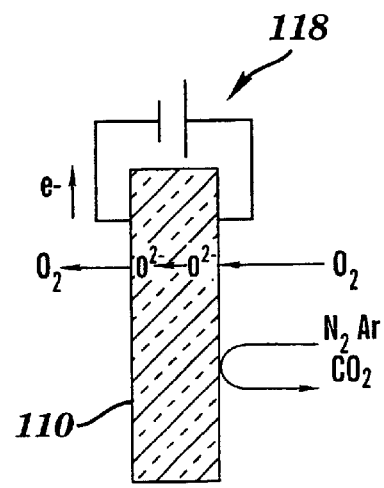
FIG. 1c is a schematic representation of the principle of oxygen separation from air through an inorganic, dense, ionic conductive membrane of the prior art, utilizing active oxygen pumping.

As shown in FIG. 1c, a similar approach known as "active oxygen pumping" utilizes a membrane 110 in combination with an external circuit 118, instead of a pressure differential, to drive the reaction.

As mentioned hereinabove, there are several disadvantages associated with the current MIEC membrane approach, which are intrinsic to oxide-conducting membranes.

One such disadvantage is their relatively high operating temperatures. The chemistry of the ceramic-noble metal MIEC membrane material requires temperatures near 800° C. for the anode and cathode reactions, as well as the ionic conduction, to proceed.

Figure 2:
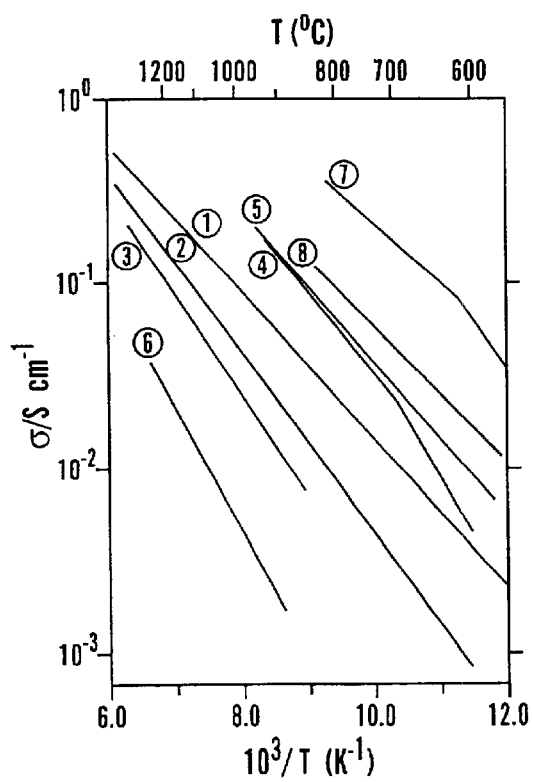
FIG. 2 is a graphical representation of the conductivity ($\sigma$) of several oxide ion conductors of the prior art, as a function of temperature.

Turning to FIG. 2, as disclosed by H. Arai, Bulletin of Ceramic Society pf Japn, 1992, V. 27, P.100, the ionic conductivity of several MIEC electrolyte materials is shown to be a function of temperature. (Plots indicated by numerals 1–8 correspond to 1. $(ZrO_2)_{0.9}(Y_2O_3)0_{0.1}$ 2. $(ZrO_2)_{0.87}(CaO)_{0.13}$ 3. $(ThO_2)_{0.93}(Y_2O_3)_{0.07}$ 4. $(CeO_{2\_0.8}(GdO_{1.5})_{0.2}$ 5. $(CeO_2)_{0.8}(SmO_{1.5})_{0.2}$ 6. $(HfO_2)_{0.88}(CaO)_{0.12}$ 7. $(Bi_2O_3)_{0.75}(Y_2O_3)_{0.25}$ 8. $(Bi_2O_3)_{0.75}(Y_2O_3)_{0.25}$ 8. $(Bi_2O_3)_{0.75}(WO_3)0.25$.

For comparison, as will be discussed in greater detail hereinbelow, an alkaline electrolyte used in an hydroxide conducting membrane of the present invention has a conductivity of 0.5 S cm$^{-1}$ at 150° C. As indicated in FIG. 2, similar conductivity is not approached by the oxide conducting membranes until near 1000° C. Moreover, equipment tolerances and the like, typically limit practical operating temperatures to about 800° C., so that MIEC membranes tend to have lower conductivity than the hydroxide-conducting membranes of the present invention.

Figure 3:
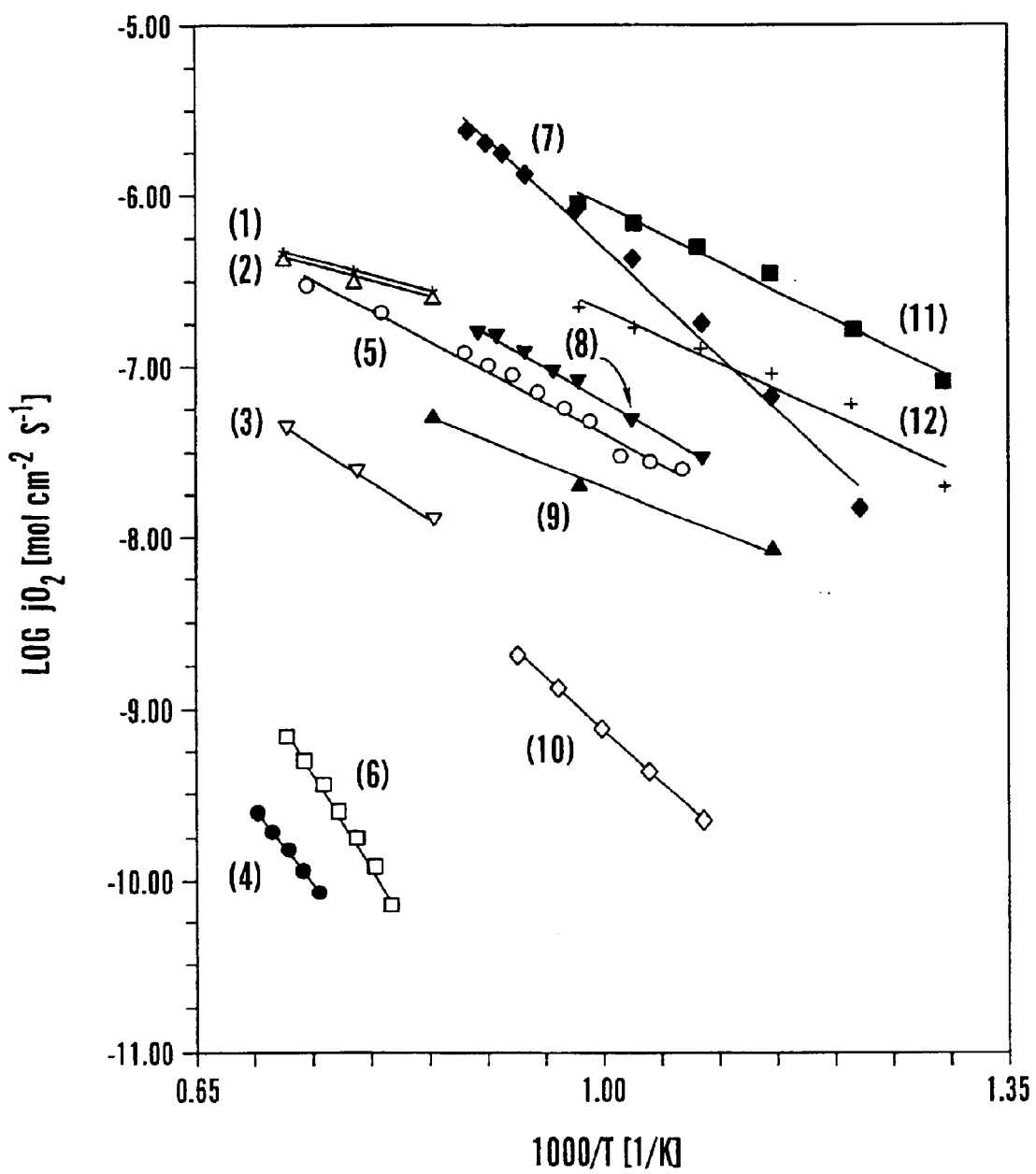
FIG. 3 is a graphical representation of Oxygen flux as a function of temperature for several MIEC membranes of the prior art.

An additional disadvantage of MIEC membranes is their relatively low oxygen throughput due to their relatively low ionic conductivity and slow surface exchange rate. As shown in FIG. 3, the CRC Handbook of Solid State Electrochemistry, Edited by P. J. Gellings, and H. J. M. Bouwmeester, P. 495. FIG. 14.2, CRC Press, 1996, which is hereby incorporated by reference, indicates that the maximum oxygen generating flux from a conventional MIEC oxide membrane is approximately 21.1 m³ per square meter membrane per day at an 800° C. operating temperature. (Note: −6 on the logarithm scale corresponds to 1 $\mu mol \cdot cm^{-2} \cdot s^{-1}$=21.1 $m^3 \cdot m^{-2} \cdot day^{-1}$=386 mA/cm².

A further disadvantage of MIEC membranes is their relatively high material and production cost. Since MIEC membranes use the same material to conduct the oxide ions and as the backbone material, restrictions are placed on the possible materials that may be used. In particular, noble metals such as platinum and palladium are generally required to obtain desirable stability at MIEC operating temperatures and to promote the oxygen surface reaction, and these metals are relatively expensive. Also, fabrication of the backbone structure requires relatively strict and careful control to produce the correct density and degree of mixing between the ceramic and the metal. This tends to increase the expense of the process and lower overall yield.

Another disadvantage of MIEC membranes is relatively low long-term stability under their operating conditions. At the 800° C. operating temperature of these membranes, the ceramic and the noble metal tend to react with one another, generating oxidization of the metal and a concomitant degradation in performance through lower conductivity. This instability generally renders such a system impractical for large-scale applications.

An engineering problem associated with systems that incorporate these high-temperature, high-pressure oxide-conducting (MIEC) membranes involves sealing the membrane so that air cannot leak past it. Any such leakage tends to disadvantageously lower the purity of oxygen on the downstream side. This problem has been addressed by welding the sides of the membrane to input and output gas lines, but it is a relatively costly and troublesome solution.

All of the above problems, which are intrinsic to the ceramic-noble metal system, illustrate the undesirability of current oxide-conducting membrane technology.

Turning now to FIG. 4a, principal structures and operation of a hydroxide-based mixed conductive membrane 210 of the present invention, are shown. The catalyst is provided as discrete layers 232 and 234, disposed at the cathode 212 and anode 214, respectively. The materials utilized for catalyst layers 232 and 234 will be discussed in greater detail hereinbelow. A discrete backbone 236 is disposed between layers 232 and 234 and in an exemplary embodiment, is fabricated from a porous ceramic material. The pores are metallized and injected with an electrolyte (i.e., 85% KOH/ 15% water). The electrolyte, i.e., due to the concentration of KOH, is solid below 100° C. and molten at higher temperatures. Surface tension serves to maintain the electrolyte within the pores of the backbone 236 when in its molten state. Advantageously, unlike in the MIEC membrane, the ionic and electronic conduction in the present invention are mediated by chemically separate materials (the electrolyte and the metal, respectively). In addition, the backbone 236 itself plays no role in the conduction.

At the cathode 212, $O_2$ molecules are reduced into hydroxide ions ($OH^-$) (instead of $O^{2-}$ as in the prior art MIEC membrane) by electrons transported from the anode 214 through the metal pores, and by protons ($H^+$) from the KOH. Balancing the reaction, $OH^-$ is relayed through the electrolyte to. the anode 214 side, where it is reoxidized into $O_2$ and released, so the electrons can return to the cathode side.

The requirements of the membrane backbone 236 are less demanding than the traditional MIEC materials, where the materials have to be oxide conductive. In the present invention, as discussed hereinabove, the backbone provides structural support without participating in any electric or electrochemical processes; therefore, a relatively large range of materials may be utilized to fabricate backbone 236.

In an exemplary embodiment, materials exhibiting relatively long term stability (tolerance to pressure differentials and repeated thermal cycling) and chemical resistance are utilized. For example, ceramic materials typically utilized in conventional Molten Carbonate Fuel Cell (MCFC) technology may be advantageously utilized due to their capacity to retain molten salt electrolytes (i.e. molten KOH), as discussed hereinabove. Several other materials may also be utilized.

For example, submicron-sized $\gamma$-$LiAlO_2$ in combination with course-grain alumina particulate (i.e., 100 $\mu$m or greater particle size), such as have been utilized as MCFC electrolyte supporting materials, may be utilized. The fine particles provide a relatively high porosity and small pore size for desirable retention of the electrolyte; the coarse particles increase the membrane's compressive strength and tend to improve the thermal cycle stability; and the fibers are added to further improve the tensile membrane strength. A typical composition for such material is shown in Table 1.

TABLE 1

| COMPOSITION | FORMULA | PARTICLE SIZE ($\mu$m) | PERCENTAGE |
|---|---|---|---|
| Fine Particle | $\gamma$-$LiAlO_2$ | 0.1 | 55% |
| Coarse Particle | $\alpha$-$Al_2O_3$ | 100 | 30% |
| Fiber | $\alpha$-$Al_2O_3$ | 5 $\mu$m (diameter), 0.5 mm to 3 mm in length | 15% |

Additional suitable materials may include commercially availa ble asbestos mats and/or sieve materials (having a molecule size on the order of microns) in combination with a high-temperature stable Teflon® (i.e., PTFE) binder. Asbestos mats with various porosities are available from various commercial sources, as are molecular sieve materials with internal micropores. The molecular sieve materials may be mixed with a high-temperature-resistant organic binder such as PTFE (i.e., Teflon® T-30 from DuPont), and then subjected to heat and pressure to form the membrane backbone 236.

Turning now to FIG. 4b, an alternate embodiment of the hydroxide conducting membrane of the present invention is shown at 310. This membrane 310 is substantially similar to membrane 210, while omitting the metallization process described hereinabove with respect to FIG. 5b. This membrane 310 thus serves as a hydroxide conductor (without providing for internal electrical conduction). This alternate embodiment thus operates with an external current pumping mechanism (i.e., circuit 118) such as shown and described hereinabove with respect to FIG. 1c. In this manner, membrane 310 provides a single conduction mode (i.e., hydroxide conduction only) rather than as a dual hydroxide-electronic conductor such as provided by membrane 210. Referring to FIGS. 8a–8c, fabrication of membrane 310 is substantially the same as shown and described hereinbelow with respect to FIGS. 5a–5d, with the omission of the metallization step of FIG. 5b.

Turning now to FIGS. 5a–5d, process steps for fabricating an exemplary membrane 210 of the present invention are shown. Turning to FIG. 5a, ceramic powder and fiber (or other material) are molded under pressure and then sintered (i.e., heated to about 900° C.) to form the porous backbone 236 with a network or array of interconnected pores 238 extending between the cathode 212 surface and anode 214 surface thereof.

As shown in FIG. 5b, a metallization layer 240 is applied to the interior surfaces of the interconnected pores 238, i.e., by conventional electroless plating, to provide an electrically conductive path extending continuously from the cathode to anode surfaces. The metallization layer is thus applied as a substantially homogeneous material, which remains chemically discrete from the backbone while being mechanically fastened thereto.

Referring to FIG. 5c, electrolyte 242 (preferably a solution of KOH in its solid state) is inserted into the pores 238 to provide an hydroxide conductive path extending continuously between the cathode and anode surfaces. This hydroxide-conducting path is homogeneous and discrete from the electric conducting path (i.e., is chemically discrete from the metallization material).

As shown in FIG. 5d, the cathode 212 and anode 214 are respectively coated with a catalyst 232 and 234, i.e., in the form of an ink or slurry. The layers of catalyst 232 and 234 are provided to facilitate the oxygen exchange process and may be identical to one another. Alternatively, catalysts 232 and 234 may be formulated discretely from one another, i.e., they may be tailored to facilitate the reduction and reoxidation processes, respectively.

Turning now to FIGS. 8a–8c, process steps for fabricating an exemplary membrane 310 of the present invention are shown. Turning to FIG. 8a, ceramic powder and fiber (or other material) are molded under pressure and then sintered (i.e., heated to about 900° C.) to form the porous backbone 336 with a network or array of interconnected pores 338 extending between the cathode 312 surface and anode 314 surface thereof.

As shown in FIG. 5b, electrolyte 342 (preferably a solution of KOH in its solid state) is inserted into the pores 338 to provide a hydroxide conductive path extending continuously between the cathode and anode surfaces.

As shown in FIG. 5c, the cathode 312 and anode 314 are respectively coated with a catalyst 332 and 334, i.e., in the form of an ink or slurry. The catalysts 332 and 334 are provided to facilitate the oxygen exchange process and may be identical to one another. Alternatively, catalysts 332 and 334 may be formulated discretely from one another, i.e., they may be tailored to facilitate the reduction and reoxidation processes, respectively.

Specific fabrication examples will be discussed in greater detail hereinbelow. In general, a dry pressing method may be utilized to fabricate the membrane backbones. This technique utilizes a die driven by hydraulic pressure to flatten the material into a membrane. Thicknesses as small as 100 microns may be achieved, which are generally thin enough so as not to be the limiting factor in the membrane's conductivity. Alternatively, to facilitate large-batch processing, a conventional tape casting process, which spreads and cuts the membrane material with a precision knife blade, may be utilized.

The metallization step includes coating the internal pores of the membrane with a thin layer (i.e., of submicron thickness) of metal. Although noble metals commonly utilized in MIEC membranes, such as platinum or palladium may be utilized, the present invention may advantageously utilize nickel. Nickel is generally not an option for the MIEC membrane because of its extremely high operating temperature. Not only is nickel a less expensive choice, it is also relatively stable in hydroxide-based electrolyte. The metal may be introduced into the pores by the conventional technique of electroless plating, which allows the plating of a metal layer on top of an insulator, such as the material (i.e., ceramic) used in the membrane backbone.

After the metallization, the membrane internal pores will be filled with electrolyte, which as discussed hereinabove, is preferably highly concentrated KOH (i.e., about 85% or more). At least two methods may be used to introduce the electrolyte into the internal pore of the membrane. In one approach, the membrane backbone is soaked in a KOH aqueous electrolyte, and then excess water is removed from the matrix by heating the sample to 200° C. in an inert environment or under low vacuum conditions. In another approach, the membrane backbone 236 is soaked in molten KOH (i.e., heated to at least 100° C.) to immerse and fill the pores.

Figure 6:
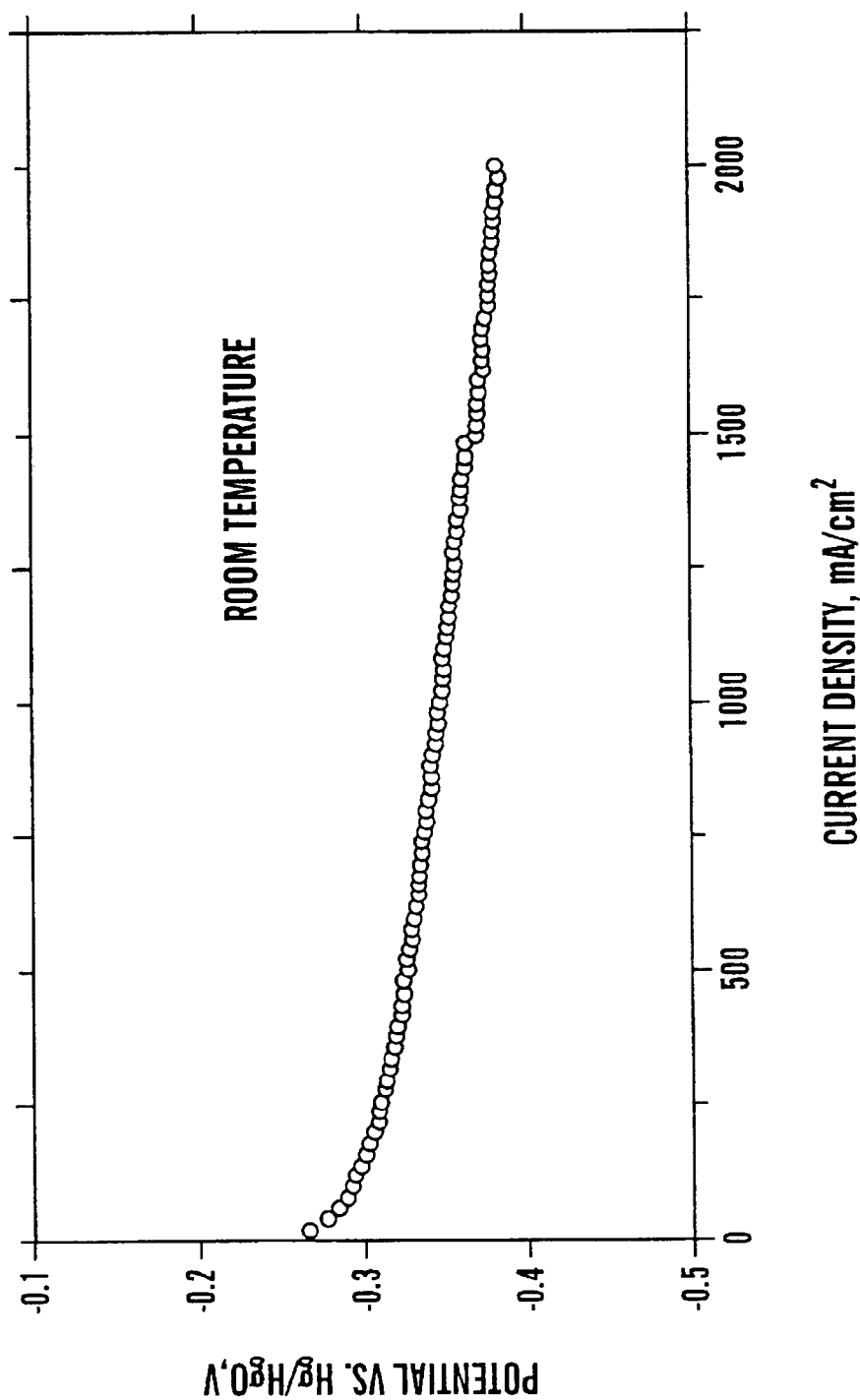
FIG. 6 is a graphical representation of cathodic polarization of the Oxygen reduction electrode of FIGS. 4 and 5 at room temperature at 1 atm of oxygen in KOH electrolyte.

An oxygen reduction/evolution catalyst utilized on the anode and cathode may be fabricated from various non-precious-metal-based inorganic catalysts, such as cobalt-phathanocyanine, cobalt tetramethoxypheny porphyrin, manganese phathanocyanine, iron phathanocyanine, $MnO_2$, various nano-grain perovskites (e.g. $LaMnO_3$) and spinels (e.g. $LiMnO_2$). For example, as shown in FIG. 6, an oxygen reduction cathode of the present invention utilizing a cobalt tetramethoxypheny porphyrin catalyst can pass more than 1500 $mA/cm^2$ with only 100 mV polarization relative to the rest potential, in an alkaline electrolyte at room temperature. This is about four times the oxygen flux of conventional MIEC oxygen membrane generators such as shown and described with respect to FIG. 3 hereinabove. At higher temperatures, such as 150° C., the performance of such a catalyst is expected to be substantially improved, for an even higher oxygen flux rate.

To optimize the catalyst function, the present invention improves the dispersion of the catalyst onto the backbone. For most of the catalysts, the catalyst is made by dispersion onto a carbon support in a solvent. The perovskite and spinel materials present a greater challenge because they are generally relatively difficult to disperse within the solvent. Several nano-material processing technologies have been developed to solve the problem. One such technology is the reverse micelle (RM) method, such as described by M. Kishida, K. Umakoshi, J. Ishiyama, H. Nagata, K. Wakabayashi, Catalyst Today, 31, 1071, 1996 (which is fully incorporated by reference herein) in which catalyst precursors and surfactants allow the binding to the carbon.

Different types of catalysts may provide better performance on the anode vs. the cathode, so an embodiment of the present invention may employ two discrete catalysts.

The catalyst may be utilized in both ink (dilute) and slurry (thicker) states applied using various application techniques. One such technique includes spray coating, in which the catalyst ink is sprayed onto the membrane. Another technique is the well-known Doctor Blade method for applying a layer of catalyst onto the membrane surface. A third approach is silk printing, in which a silk screen will be used to print the slurry onto the membrane surface with predetermined thickness. Those skilled in the art will recognize that a particular application process may be selected based upon the particular variations in adhesion, uniformity, and run-to-run thickness consistency provided thereby.

Figure 7A:
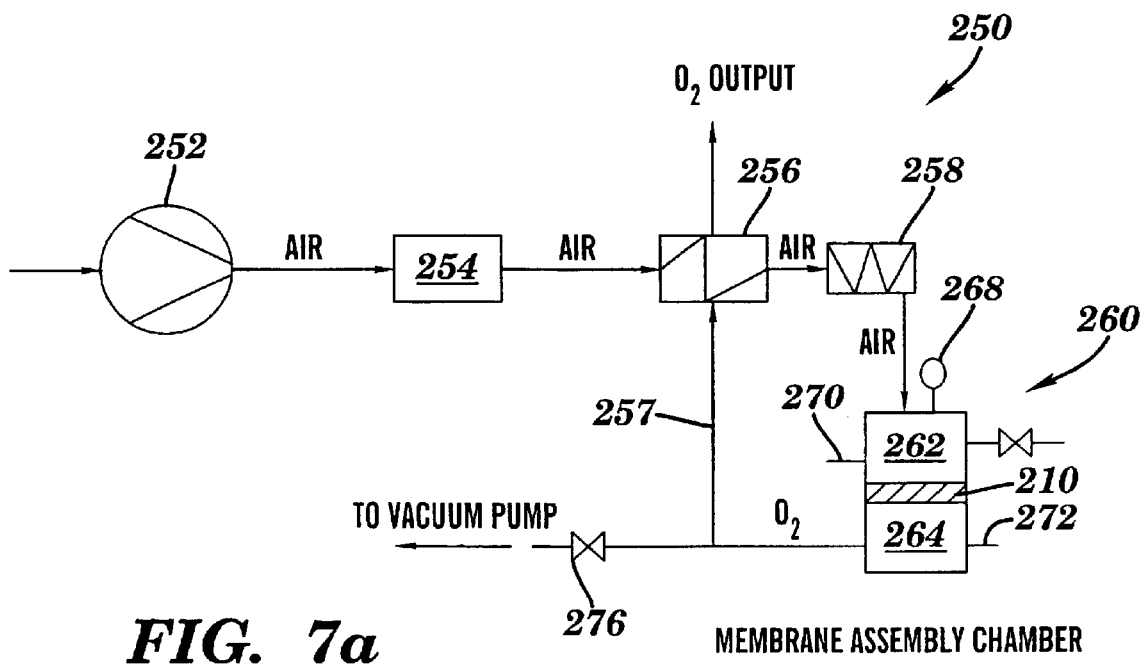
FIG. 7a is a schematic diagram of an oxygen separation system using the hydroxide conductive membrane of FIGS. 4 and 5.

The completed hydroxide-conductive membrane 210 may be integrated into a system 250 such as shown schematically in FIG. 7a. As shown, compressed air provided by a compressor 252 is fed into a $CO_2$-scrubber 254. The scrubber 254 is a conventional device, such as one which utilizes limestone and which may be easily regenerated as required by heating it off-line. As $CO_2$ may react with KOH, the scrubber 254 serves to reduce the $CO_2$ content to sufficiently low levels so as to not adversely affect operation of the membrane. The compressed air is then fed to a conventional recuperative heat exchanger 256, which utilizes the Oxygen emerging from the membrane 210 along flow path 257 to preheat the air. The air emerging from the heat exchanger 256 is then fed to a discrete heater 258 that heats the air to a predetermined operating temperature (i.e., up to 300° C.). The heated air is then fed into the oxygen separation chamber 260.

Figure 7B:
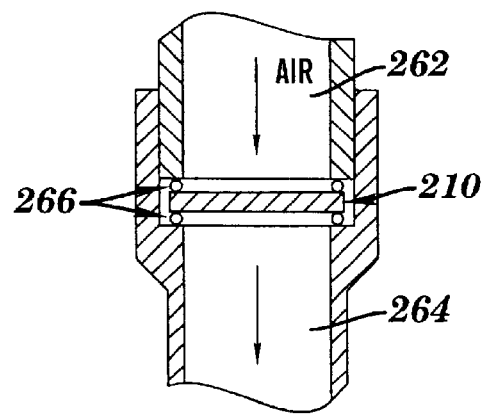

As best shown in FIG. 7b, chamber 260 includes an air chamber 262 and an oxygen chamber 264, with the membrane 210 mounted therebetween in a substantially air-tight (i.e., gas-tight) manner. As shown, two O-ring-type gaskets 266 made of PTFE (i.e., Teflon®) or natural or synthetic rubber, may be utilized to provide such gas-tight mounting. Advantageously, the low temperature operation of the membrane 210 obviates the need for relatively complicated and/or expensive welding or other sealing techniques generally utilized to seal prior art high-operating-temperature MIEC membranes.

As also shown in FIG. 7a, oxygen emerging from chamber 264 is coupled by flow path 257 to heat exchanger 256 to preheat the incoming air as discussed above, and is ultimately coupled to an oxygen collection device (not shown). A vacuum pump (not shown) also may be coupled to flow path 257 through a valve 276 to evacuate the oxygen chamber at the beginning of the operation. Pressure and temperature sensors 268 and 270, respectively, are preferably utilized in the air chamber 262 to monitor the gas pressure and temperature. An oxygen gas sensor 272 may be used to monitor the level of oxygen within the oxygen chamber 264. The system 250 thus provides for relatively simple and inexpensive oxygen production.

The non-metallized membrane 310 of FIG. 4b may be utilized in place of membrane 210 in a system that is similar to that of FIGS. 7a and 7b, but which does not require a pressure gradient across the membrane. Circuit 118 (FIG. 4b) is utilized to drive the oxygen generation process. The skilled artisan will thus recognize that such a system may omit compressor 252 and pressure gauge 268.

The following illustrative examples are intended to demonstrate certain aspects of the present invention. It is to be understood that these examples should not be construed as limiting.

EXAMPLE 1

A Membrane Backbone is fabricated by:
1. Dispersing ceramic powders in a distilled water solution with a commercial disperser (such as Colloid # 261 from Rhone-Porlene, or Triton X-100 from Aldrich) under constant stirring;
2. Adding 10–20% chopped alumina fibers (of a few mm in length) into the water solution under constant stirring until a homogeneous slurry is obtained;
3. Adding 2–5% organic binder, such as XUS from Dow Chemical or T-30 from DuPont, to the slurry, while stirring for one more hour;
4. Drying the slurry in the oven at 70° C. for 24 hours until completely dry;
5. Weighing a few grams of the material obtained from step 4 and putting into the press die to flatten into a membrane;
6. Sintering the membrane in air at 900° C. to obtain the final membrane;
7. Measuring the green density of the membrane, and comparing with the theoretical density to obtain the porosity of the membrane;
8. Correlating the porosity with the dry pressing pressure to evaluate the structural integrity.

Additional membranes are fabricated utilizing the above process and modifying the following parameters:
1. Composition of the ceramic powders and alumina fibers.
2. Organic binder selection and percentage of the binder.
3. Thickness of the membrane.
4. The pressure applied to the membrane during dry pressing, and the resultant porosity of the membrane. (In general, porosity is as large as possible, without unduly compromising structural integrity of the membrane, since higher porosity holds more electrolyte for relatively higher ionic conductivity.)

EXAMPLE 2

The pores of the membranes of Example 1 are metallized using electroless nickel plating techniques to coat the pores with metal (i.e., nickel) to provide electrical conductivity. The process includes the following steps (with solution composition included in Table 2 hereinbelow):
1. Dipping the membrane in the sensitization Solution A for 4–5 min. and rinse with de-ionized water several times;
2. Seeding with palladium active sites by dipping the membrane into the Solution B for 1–2 min., then rinse with de-ionized water several times;
3. Dipping the membrane in solution C for a time for an empirically-determined time to completely coat the pores;
4. Rinsing with de-ionized water and dry in the oven at 70° C.

At this point, the membrane is substantially as shown and described with respect to FIG. 5b, and is an effective electronic conductor. Although nickel is a preferred, other conductive metals such as gold may be utilized.

TABLE 2

| Exemplary Solutions Used in the Electroless Metallization of the Membranes. | | |
|---|---|---|
| SOLUTION A | SOLUTION B | SOLUTION C |
| Composition $SnCl_2$ 1 g/100 ml HCl 4 ml/L | $PdCl_2$ 0.025 g/100 ml HCl 0.25 ml/100 ml | $NiSo_4$ 25 g/L Potassium citrate 30 g/L Sodium hypophosphite 25 g/L Thiourea 0.5 ppm pH 4–4.6, T = 90° C. |

EXAMPLE 3

The membrane of Examples 1 and 2 is injected with electrolyte (i.e., doped) by a solution dehydration process in which the membrane backbone is soaked in a KOH aqueous electrolyte (40% wt), and then excess water is removed from the matrix by heating the sample to 200° C. in an inert environment or under low vacuum conditions. At this point, the membrane is substantially as shown and described hereinabove with respect to FIG. 5c, and may conduct both ions and electrons.

EXAMPLE 4

The membrane of Examples 1 and 2 is injected with electrolyte (i.e., doped) by a molten electrolyte process in which a potassium hydroxide pellet is melted in a nickel container at about 100° C. and the membrane immersed for an empirically-determined period of time (until the electrolyte completely fills the pores). At this point, the membrane is substantially as shown and described hereinabove with respect to FIG. 5c, and may conduct both ions and electrons.

EXAMPLE 5

The anodes and cathodes of the membranes of Examples 3 and 4 are provided with various Oxygen reduction and evolution catalysts, such as CoTMPP, CoPc, various perovskites (e.g. $LaMnO_3$) and spinels (e.g. $LiMnO_2$). The catalyst composition and process for the anode and cathode is determined independently to specialize the catalysts for oxygen reduction and evolution.

The following procedure is utilized to produce a catalyst ink or slurry consisting of CoTMPP and CoPc:
1. Disperse carbon (such as Vulcan X-72) in a solvent (such as acetone) under stirring;
2. Dissolve CoTMPP or CoPc in the suspension by adding slowly;
3. Stir the mixture overnight, so the catalyst will coat the internal surface of the carbon material;
4. Evaporate the solvent slowly, so that only the catalyzed carbon remains;
5. Mix the catalyzed carbon with more Vulcan X-72 and disperse them in deionized water with the help of surfactant such as Triton X-100 (Aldrich) under vigorous stirring for about 2 hours;
6. Add PTFE binder (Teflon® T-30 from DuPont) in 10–20% wt. to the slurry, stirring continuously for 3 hours;
7. Filter out the most of the water and dry in the oven at 100° C.;
8. Sinter at 340° C. to network the binder;
9. Grind into a powder, which can be used to make an ink or slurry.

For the perovskite (e.g. $LaMnO_3$) and spinel (e.g., $LiMnO_2$) materials, a dispersion may employ the reverse micelle method as discussed hereinabove.

EXAMPLE 6

The catalyst ink or slurry produced in Example 5 is applied to the membranes produced in Examples 3 and 4 by the following methods:
1. Spray coating: the catalyst ink will be sprayed onto the surface of the membrane, and then dried at elevated temperature;
2. Doctor Blade method for slurry application;
3. Silk printing.

After the catalyzation, the membrane is be heated to 150° C. in a final drying step. At this point, the membrane is substantially as shown and described hereinabove with respect to FIG. 5d).

EXAMPLE 7

A system substantially as shown and described hereinabove with respect to FIGS. 7a and 7b is fabricated and tested at various compressed air pressures from 1 to 15 atm, and temperatures from 25° C. to 300° C., to determine oxygen throughput of the complete membrane system. Advantages such as Oxygen throughput up to 5 times higher than that of the current MIEC membranes is expected while operating at significantly lower temperatures. A summary of expected test results indicating the advantages of the Hydroxide-Conductive Membrane of the present invention relative to conventional Oxide Ion Conductive (MIEC) membranes is shown in Table 3.

TABLE 3

| | MIEC MEMBRANE | PRESENT INVENTION |
|---|---|---|
| Conducting Species | $O^{2-}$ | $OH^-$ |
| Mixed Conducting | Yes | Yes |
| Conductivity at low Temperature | Two to four order of magnitude lower (~$10^{-4}$ S $cm^{-1}$) | High (approximately 0.5 S $cm^{-1}$) |
| Surface Exchange Kinetics | Slow | Fast |
| Oxygen flux | High (21 $m^3 \cdot m^{-2} \cdot day^{-1}$) | 5 times higher (about 100 $m^3$ per square meter membrane per day) |
| Operating Temperature | 700–1100° C. | 25–300° C. (preferably 25–150° C.) |
| Cost of Membrane | High (defect sensitive) | Low (relatively defect non-sensitive) |
| Stability | Limited time | Relatively Stable |
| Gas Sealing | Difficult (due to high temperature) | Easy (due to low temperature) |

Thus, by utilizing the hydroxide ion ($OH^-$) instead of oxide ion ($O^{2-}$) to shuttle the oxygen molecule through a membrane, oxygen throughput is substantially increased relative to the prior art.

Moreover, the operating temperature may be reduced relative to the prior art, from about 800° C. to about 150° C., and possibly as low as room temperature. This will greatly reduce the system cost and alleviate many engineering problems, such as difficulties with gas sealing as discussed hereinabove.

A much greater variety of materials may be chosen for both the electronic conductor and the membrane backbone, since the backbone does not need to participate in electrical or ionic conduction. Moreover, the present invention may use a relatively inexpensive metal such as nickel for the electronic conductor instead of costly platinum or palladium. The backbone material may be chosen for its chemical resistance and tolerance to thermal cycling and pressure differentials.

Further, conducting the two species with different materials places fewer restrictions on fabrication conditions. While a MIEC membrane generally has low tolerance for defects in the ceramic-metal composite (because the structure strongly influences the conductivity), the membrane backbone of the present invention serves only to support the electrolyte, and thus may tolerate relatively more defects, to reduce fabrication expense thereof.

The hydroxide-conducting membrane of the present invention advantageously may be utilized in many chemical, electronics, and medical technologies that depend on high-purity oxygen. Additionally, the present invention may be utilized to assist in making many industrial processes more environmentally sound.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention,
What is claimed is:

1. An oxygen separating membrane, said membrane comprising:
   a backbone having a first surface and a second surface and an array of interconnected pores extending therebetween;
   a hydroxide ion conductor extending through said pores from said first surface to said second surface; and
   an electrical conductor extending through said pores from said first surface to said second surface, said electrical conductor being discrete from said ion conductor,
   wherein said electrical conductor comprises a metallization material disposed on walls of said pores.

2. The membrane of claim 1, wherein said backbone, said hydroxide ion conductor and said electrical conductor are all mutually discrete from one another.

3. The membrane of claim 1, further comprising at least one catalyst disposed on each of said first surface and said second surface.

4. The membrane of claim 3, wherein said at least one catalyst comprises an inorganic material lacking a precious metal, carbon and a binder.

5. The membrane of claim 4, wherein said non-precious-metal-based inorganic material is selected from the group consisting of:
   cobalt-phathanocyanine, manganese phathanocyanine, iron phathanocyanine, cobalt tetramethoxypheny porphyrin (CoTMPP), CoPC, $MnO_2$, nano-grain perovskites, spinels, and combinations thereof.

6. The membrane of claim 1, wherein oxygen molecules are reduced into hydroxide ions at said first surface and the hydroxide ions are reoxidized at said second surface.

7. The membrane of claim 1, adapted for generating oxygen flux of at least about 20 $m^3$ per square meter membrane per day at an operating temperature within a range of about 25 to 500° C.

8. The membrane of claim 7, adapted for generating oxygen flux of at least about 20 $m^3$ per square meter membrane per day at an operating temperature within a range of about 25 to 150° C.

9. The membrane of claim 1, wherein said metallization material comprises nickel.

10. The membrane of claim 1, wherein said metallization material is selected from the group consisting of platinum, palladium, nickel, and combinations thereof.

11. The membrane of claim 1, wherein said hydroxide ion conductor comprises an electrolyte disposed within said pores in engagement with said metallization material.

12. The membrane of claim 11, wherein said electrolyte is disposed in a solid state at room temperature.

13. The membrane of claim 12, wherein said electrolyte is disposed in a liquid state at an operating temperature of said membrane, wherein surface tension of said electrolyte maintains said electrolyte within said pores.

14. The membrane of claim 11, wherein said electrolyte comprises KOH.

15. The membrane of claim 1, wherein said first surface comprises an anode and said second surface comprises a cathode.

16. The membrane of claim 15, further comprising a first catalyst disposed on said anode and a second catalyst disposed on said cathode.

17. The membrane of claim 1, wherein said backbone is fabricated from a ceramic material.

18. The membrane of claim 17, wherein said backbone further comprises a ceramic and fiber mixture.

19. The membrane of claim 1, wherein said backbone includes materials selected from the group consisting of: $\gamma$-$LiAlO_2$ particles, $\alpha$-$Al_2O_3$ particles and $\alpha$-$Al_2O_3$ fibers; asbestos mats; molecular sieve materials in combination with a PTFE binder; and combinations thereof.

20. The membrane of claim 19, wherein said backbone is fabricated from a mixture of submicron-sized $\gamma$-$LiAlO_2$ particles, $\alpha$-$Al_2O_3$ particles having a particle size greater than about 100 $\mu$m and $\alpha$-$Al_2O_3$ fibers having a diameter of about 3 to 15 $\mu$m.

21. The membrane of claim 1, wherein said backbone is inert.

22. A system for separating oxygen from air, said system comprising:
   the oxygen separating membrane of claim 1;
   an air chamber disposed in fluid communication with said anode;
   an oxygen chamber disposed in fluid communication with said cathode; said air chamber being disposed at a higher pressure than said oxygen chamber to form a pressure gradient;
   wherein said pressure gradient generates oxygen flow into said oxygen chamber.

23. The system of claim 22, further comprising an air compressor disposed in fluid communication with said air chamber.

24. The system of claim 23, further comprising a vacuum pump disposed in fluid communication with said oxygen chamber.

25. The system of claim 22, further comprising a heat source disposed in fluid communication with said air chamber.

26. The system of claim 22, further comprising a $CO_2$ scrubber disposed in fluid communication with said air chamber.

27. A system for separating oxygen from air, said system comprising:
   an oxygen separating membrane including a backbone having a first surface and a second surface and an array of interconnected pores extending therebetween; a hydroxide ion conductor extending through said pores from said first surface to said second surface; and an electrical conductor extending through said pores from said first surface to said second surface, said electrical conductor being discrete from said ion conductor;
   an air chamber disposed in fluid communication with said anode,
   a $CO_2$ scrubber disposed in fluid communication with said air chamber;
   an oxygen chamber disposed in fluid communication with said cathode; said air chamber being disposed at a higher pressure than said oxygen chamber to form a pressure gradient;
   wherein said pressure gradient generates oxygen flow into said oxygen chamber.

28. A system for separating oxygen from air, said system comprising:
   an oxygen separating membrane comprising including a backbone having a first surface and a second surface and an array of interconnected pores extending therebetween; and a hydroxide ion conductor extending through said pores from said first surface to said second surface;
   an air chamber disposed in fluid communication with said anode;
   a $CO_2$ scrubber disposed in fluid communication with said air chamber.

an oxygen chamber disposed in fluid communication with said cathode; a voltage source coupled to said membrane to maintain said anode at a higher electric potential than said cathode to form a voltage gradient; wherein said voltage gradient generates oxygen flow into said oxygen chamber.

* * * * *